(12) United States Patent
Hollabaugh et al.

(10) Patent No.: US 7,468,469 B2
(45) Date of Patent: Dec. 23, 2008

(54) DISSOLVED OXYGEN RELEASING COMPOUND

(75) Inventors: Robert Hollabaugh, Cocoa, FL (US); I. Richard Schaffner, Jr., Goffstown, NH (US)

(73) Assignee: E.S.P. Environmental Service Products, Rockledge, FL (US)

( * ) Notice: Subject to any disclaimer, the term of this patent is extended or adjusted under 35 U.S.C. 154(b) by 444 days.

(21) Appl. No.: 11/065,381

(22) Filed: Feb. 24, 2005

(65) Prior Publication Data

US 2005/0173672 A1      Aug. 11, 2005

Related U.S. Application Data

(63) Continuation-in-part of application No. 10/118,099, filed on Apr. 8, 2002, now abandoned.

(51) Int. Cl.
| | |
|---|---|
| A62D 3/00 | (2007.01) |
| A62D 3/02 | (2007.01) |
| A62D 3/38 | (2007.01) |
| C02F 1/72 | (2006.01) |
| C09K 8/74 | (2006.01) |
| E21B 37/06 | (2006.01) |
| E21B 43/22 | (2006.01) |
| B09C 1/08 | (2006.01) |
| B09C 1/10 | (2006.01) |

(52) U.S. Cl. ............ 588/300; 588/320; 588/400; 588/414; 210/749; 210/759; 507/269; 507/277; 507/920; 507/927; 252/186.25; 252/186.27; 166/246; 405/128.15; 405/128.5; 405/129.25

(58) Field of Classification Search ............ 588/300
See application file for complete search history.

(56) References Cited

U.S. PATENT DOCUMENTS

| | | | | | |
|---|---|---|---|---|---|
| 5,854,061 | A * | 12/1998 | Horn et al. | | 435/262.5 |
| 5,879,107 | A * | 3/1999 | Kiest et al. | | 405/128.5 |
| 6,569,342 | B1 * | 5/2003 | Willuweit et al. | | 210/714 |
| 6,749,600 | B1 * | 6/2004 | Levy | | 604/527 |
| 7,160,483 | B1 * | 1/2007 | Hince | | 252/186.2 |
| 2003/0189187 | A1 * | 10/2003 | Hollabaugh et al. | | 252/186.27 |
| 2004/0245496 | A1 * | 12/2004 | Taoda | | 252/186.1 |
| 2005/0173672 | A1 * | 8/2005 | Hollabaugh et al. | | 252/186.25 |

* cited by examiner

*Primary Examiner*—Joseph D Anthony
(74) *Attorney, Agent, or Firm*—William B. Ritchie

(57) ABSTRACT

A dissolved oxygen releasing blend is disclosed utilizing magnesium peroxide blended with powdered Bentonite and/or vegetable oil. The Bentonite (or other clay material) reduces the hydraulic conductivity of magnesium peroxide, thereby reducing the rate of magnesium peroxide disassociation.

3 Claims, 1 Drawing Sheet

| Magnesium Peroxide (MP) Grade Formulated with DORA ($\%_{Mass}$ MP) | Oxygen Content ($\%_{Mass}$ Oxygen/DORA) |
|---|---|
| 20 | 9.1 |
| 25 | 11.4 |
| 30 | 13.6 |
| 35 | 15.9 |
| 40 | 18.2 |

| Magnesium Peroxide (MP) Grade Formulated with DORA (%$_{Mass}$ MP) | Oxygen Content (%$_{Mass}$ Oxygen/DORA) |
|---|---|
| 20 | 9.1 |
| 25 | 11.4 |
| 30 | 13.6 |
| 35 | 15.9 |
| 40 | 18.2 |

Fig. 1

| Magnesium Peroxide (MP) Grade Formulated with DORA (%$_{Mass}$ MP) | Mass Ratio (mg DORA/mg Total BTEX) |
|---|---|
| 20 | 11.0 |
| 25 | 8.8 |
| 30 | 7.3 |
| 35 | 6.3 |
| 40 | 5.5 |

Fig. 2

DISSOLVED OXYGEN RELEASING COMPOUND

This application is a continuation-in-part of U.S. patent application Ser. No. 10/118,099, filed Apr. 8, 2002, now abandoned.

FIELD OF THE INVENTION

This invention relates to the field of biological stimulants and, in particular, to such stimulants used in the attenuation of environmental contaminants.

BACKGROUND OF THE INVENTION

Biological stimulants are often used to enhance the natural attenuation of environmental contaminants. Bioremediation products are commercially used to attenuate such contaminants as fuel hydrocarbon constituents and organic solvents that may be biologically transformed or immobilized under aerobic conditions. The dissolved oxygen released from such products transforms/immobilizes the contaminants.

For this reason, a slow dissolved oxygen release is preferred to increase contact with the contaminants dissolved in groundwater or adsorbed onto the formation matrix. A fast release is ineffective when trying to remove the contaminants. For example, magnesium/calcium peroxide is a potential stimulant for contaminant attenuation. However, upon hydration these peroxides tend to disassociate rapidly. In fact, magnesium/calcium peroxide can release their entire dissolved oxygen load within a few weeks of hydration. For optimum use, such stimulants must release dissolved oxygen slowly over a longer period of time, on the order of months and not weeks.

There are other compounds, such as $MgO_2$, that slowly release oxygen when chemically bonded with phosphate. This release of oxygen is a chemical process. Again, if the oxygen is released too fast, the compound is useless as a bioremediation product. While chemically-bonded products can solve the time-releasing problem, such compounds can be costly to manufacture and use in large amounts.

U.S. Pat. No. 6,569,342, issued to Willuweit et al. on May 27, 2003, discloses a method for treating water wherein an alkaline earth metal peroxide is brought into contact with water to immobilize phosphates and heavy metals except manganese and iron. This method accomplishes the task by rapidly changing the pH, counteracting the oxygen deficit. This does not result in the magnesium peroxide that Willuweit says may be substituted for calcium peroxide to disassociate to dissolved oxygen at a slower rate than it would be if magnesium peroxide were by itself Willuweit et al. also suggests that bentonites may be added to his mixture but provides no reason why this might be desirable or any suggestion as to what % weight of bentonites are suggested for a given weight of alkaline earth metal peroxide. Further, Willuweit et al. teaches that, for practical reasons, the bentonites if added should be compacted and used as granules, pellets or tablets.

Therefore, what is needed is a blend to release dissolved oxygen that can be manufactured without using a chemical process. A blend for use as a bioremediation product that releases dissolved oxygen slowly over a long time frame is also needed. Such a blend that satisfies the time frame demands at a low cost is not commercial available.

SUMMARY OF THE INVENTION

The present invention is a dissolved oxygen releasing compound (hereinafter abbreviated as DORC). The invention is a blend of magnesium peroxide and binding agents that are added to decrease the rate at which magnesium peroxide disassociates upon hydration to yield dissolved oxygen and magnesium cation. Magnesium peroxide, chemically similar to calcium peroxide, tends to disassociate rapidly upon hydration without the addition of binding agents or other engineered controls to slow the disassociation rate. Without such controls, the entire load of dissolved oxygen will be released within weeks of hydration. To be usable as a bioremediation product, the rate of disassociation of magnesium peroxide must be decreased, thereby increasing the time period of dissolved oxygen release.

In the present invention, Bentonite is used as an engineered control to reduce the disassociation rate. While Bentonite is specified, the invention specified herein includes other such phyllosilicate clay materials which may also be used to decrease the rate of dissolved oxygen release. Bentonite is mixed in a predetermined ratio by mass with magnesium peroxide. When this blend is hydrated, the release of dissolved oxygen continues at an acceptable rate for a time frame on the order of six months. An acceptable rate essentially means the rate of dissolved oxygen release over the time period are adequate to transform/immobilize the biological contaminants of concern.

The invention also contemplates alternate embodiments of the dissolved oxygen releasing blend. These include magnesium peroxide blended with powdered Bentonite and/or vegetable oil. The mixture of Bentonite and vegetable oil with magnesium peroxide reduces the rate of magnesium peroxide dissociation upon hydration, therefore, the rate of dissolved oxygen release. When this mixture is introduced to environmental media, biological degradation of contaminants such as petroleum hydrocarbons will be enhanced as a consequence of the having dissolved oxygen released more slowly.

Therefore, it is an aspect of this invention to provide a dissolved oxygen releasing blend for use as a bioremediation product.

It is another aspect of the invention to provide a dissolved oxygen releasing blend comprising magnesium peroxide blended with Bentonite or other clay materials.

It is a further aspect of the invention to provide a blend to assist in the attenuation of environmental contaminants. Environmental contaminants are defined as anthropogenic contaminants that are biologically degradable under aerobic conditions.

It is yet another aspect of the invention to provide a blend to release dissolved oxygen over an extended time frame.

These aspects of the invention are not meant to be exclusive and other features, aspects, and advantages of the present invention will be readily apparent to those of ordinary skill in the art when read in conjunction with the appended claims and accompanying description.

DETAILED DESCRIPTION OF THE INVENTION

Magnesium peroxide disassociates upon hydration to yield dissolved oxygen and the cation magnesium (II). In order to slow the disassociation process, the magnesium peroxide is blended with a binding agent. The resulting dissolved oxygen releasing blend must be readily and inexpensively manufactured, and also release significant concentrations of dissolved oxygen over an extended period of time, on the order of six months or more.

The disassociation of magnesium peroxide to dissolved oxygen is primarily controlled by kinetic processes. Therefore, the binding agents used must slow the kinetics of magnesium peroxide disassociation. In the present invention, a powdered phyllosilicate is used as a binding agent to reduce the hydraulic conductivity of magnesium peroxide, thereby reducing the rate of dissolved oxygen release. In the preferred embodiment, the powdered phyllosilicate used is Bentonite.

A variety of blends of magnesium peroxide and powdered Bentonite were studied to determine the optimum blend for use as a bioremediation product. Specifically, three blends, one consisting of 50% by mass magnesium peroxide and 50% powdered bentonite, the second of 65% by mass magnesium peroxide and 35% powdered Bentonite, and the third 80% by mass magnesium peroxide and 20% powdered Bentonite, were considered.

To stimulate the enhanced, aerobic biological degradation of fuel hydrocarbon constituents by native microflora, sufficient dissolved oxygen must be provided to satisfy the oxygen demand posed by the contaminants of concern, the assimilative demand posed by biomass production, and the oxygen demand exerted by competing electron donors. According to Wiedemier T. H., Wilson, J. T., and Kampbell, D. K., Miller, R. N., and Hansen, J. E., 1999, *TECHNICAL PROTOCOL FOR IMPLEMENTING INTRINSIC REMEDIATION WITH LONG-TERM MONITORING FOR NATURAL ATTENUATION OF FUEL CONTAMINATION DISSOLVED IN GROUNDWATER,* AIR FORCE CENTER FOR ENVIRONMENTAL EXCELLENCE, v. II, 183 pgs, approximately 1.0 milligrams (mg) of oxygen are required to mineralize about 1.0 mg of total benzene, toluene, ethylbenzene, and xylenes (total BTEX), including that amount assimilated during biomass production.

BRIEF DESCRIPTION OF THE DRAWINGS

FIG. 1 displays the oxygen content for different grades of magnesium peroxide.

FIG. 2 displays the estimated mass ratios of the invention blends required to treat total BTEX.

The invention may be formulated with different grades of metal peroxide, ranging from about $20\%_{Mass}$ to $40\%_{Mass}$ magnesium peroxide, with remaining minor constituents including magnesium oxide, magnesium hydroxide, and trace inorganic compounds. Of the various constituents, only the magnesium peroxide disassociates to yield dissolved oxygen. The preferred blend for the invention is formulated with $80\%_{Mass}$ magnesium peroxide and $20\%_{Mass}$ bentonite. Given the range of magnesium peroxide grades available for formulation and the $80\%_{Mass}$ bulk fraction of magnesium peroxide in invention, the oxygen content for the different grades of magnesium peroxide is shown in FIG. 1.

Assuming total BTEX as the idealized contaminant of concern, the stoichiometric ratio of approximately 1.0 mg of oxygen required to mineralize 1.0 mg of total BTEX as noted above and the range of oxygen contents for different magnesium peroxide grades, the mass ratio of the invention blend required to treat total BTEX can be estimated as shown in FIG. 2.

These mass ratio estimates of the invention relative to the Total BTEX do not consider the presence of competing electron donors such as natural organic matter (e.g., humic acid derived from the biological degradation of vegetative matter) or other anthropogenic organic matter (e.g., other alkylbenzenes), which may also exert an oxygen demand upon environmental media. Therefore, in addition to estimating invention loads based upon contaminant concentrations, it is recommended that at least two groundwater samples be collected from the fuel hydrocarbon-impacted area of the site, each from the same hydrogeologic unit, for laboratory analysis for Biochemical Oxygen Demand (BOD). BOD is an estimate of the amount of dissolved oxygen consumed by microorganisms during the biochemical oxidation of biochemically reduced matter.

It is also recommended that performance monitoring include the collection of dissolved oxygen concentration data from groundwater within the desired treatment zone and sufficient amounts of the invention be supplied in the event that contaminant concentrations remain above regulatory action levels and dissolved oxygen concentrations decrease to <2 mg per liter.

To evaluate the potential effectiveness of these blends, a lab-scale microcosm study was performed as follows. The blends were suspended in injection socks 1-foot long and constructed of rip-stop nylon fabric. Three socks of each blend were inserted into a designed microcosm. Each microcosm consisted of 2-inch SCH 40 PVC riser pipe with an end cap including a flow meter. The flow meter was connected to a gas chamber including two fritted stone gas diffusers to sparge nitrogen gas through the water in that chamber. The gas diffusers were plumbed to a nitrogen gas source that ran continuously during the study at a flow rate sufficient to strip oxygen and maintain relatively low dissolved oxygen concentrations in column influent, about <1.0 mg/L. By stripping dissolved oxygen from column influent, any dissolved oxygen measured in column effluent above background may be attributed to the respective sock load. Microcosms were positioned so that column influent and effluent ports were at the top and bottom of each microcosm respectively. Water was circulated through the closed system at a rate of 40 ml/minute per each microcosm. The microcosm study was carried out until such time as respective dissolved oxygen loads were depleted, which occurred at about six months.

A commercially available Oxygen Releasing Compound (hereinafter abbreviated as ORC) manufactured by Regenesis Bioremediation Products, Inc., was subjected to the study described above (of equivalent mass to DORC) and was found to release dissolved oxygen on average about a rate of 2.1 mg/L over the study duration (6 months). The first blend of magnesium peroxide and powdered Bentonite (the 50%/50% blend) had an average concentration of 2.8 mg/L, the second blend (65%/35%) had about 3.7 mg/L and the third (80%/20%) about 3.3 mg/L. However, the mean monthly data showed the 50%/50% blend had low mean release rates for months 3 through 6, indicating the dissolved oxygen load of this blend were released too quickly. Additionally, the 65%/35% blend had high mean dissolved oxygen release for the first three months, indicating its magnesium peroxide will be spent quickly. The blend of 80% magnesium peroxide to 20% powdered Bentonite was thus a more optimum blend for use as a bioremediation product.

The microcosm study described above was also carried out using blends of magnesium peroxide and vegetable oil, or magnesium peroxide with vegetable oil and powdered Bentonite. The vegetable oil was added as a hydrophobic wetting envelope to temporarily isolate the magnesium peroxide from groundwater, thereby reducing the rate of disassociation. While vegetable oil might compete with organic contaminants for dissolved oxygen in aqueous settings, the relatively high pH yielded during magnesium peroxide disassociation should inhibit microbial utilization of the vegetable oil such that it would not stimulate indigenous bacteria to scavenge significant dissolved oxygen. Additionally, because the vegetable oil has nominal aqueous solubility, it is not mobile and cannot exert oxygen demand at a distance from where it is injected. In blends containing mixtures of powdered Bentonite and vegetable oil, the magnesium peroxide was first blended with the vegetable oil before the powdered Bentonite was added so that vegetable oil coated the magnesium peroxide and not the Bentonite.

Two blends of magnesium peroxide and vegetable oil were tested. The first included 17.4 pounds of magnesium peroxide per gallon of vegetable oil (17.4 lbs/GAL). The second was 17.4 lbs/GAL+29.6 lbs/GAL+41.7 lbs/GAL. While these ratios are specified, the invention includes other potential blend ratios of magnesium peroxide and vegetable oil that may slow the rates of dissolved oxygen release.

The study included three blends of magnesium peroxide, vegetable oil and powdered Bentonite. The first was 17.4 lbs/GAL+50% by mass magnesium peroxide and 50% Bentonite. The second was 17.4 lbs/GAL+80% by mass magnesium peroxide and 20% Bentonite. And the third blend included 7.4 lbs/GAL+29.6 lbs/GAL+41.7 lbs/GAL+80% by mass magnesium peroxide and 20% Bentonite.

Neither of the magnesium peroxide/vegetable oil blends showed a satisfactory average release rate over the six month study. However, certain blends including vegetable oil and powdered Bentonite showed an average release of 2.6 mg/L and 3.0 mg/L respectively. These two blends also showed monthly mean release values that indicated the dissolved oxygen load was not spent too quickly. Therefore, while the preferred embodiment of the invention is a blend of 80% by mass magnesium peroxide and 20% powdered Bentonite, the blend consisting of 17.4 lbs magnesium peroxide/GAL vegetable oil+50% by mass magnesium peroxide and 50% Bentonite and the blend of 7.4 lbs/GAL+29.6 lbs/GAL+41.7 lbs/GAL+80% by mass magnesium peroxide and 20% Bentonite are alternate embodiments. In all embodiments, it appears the magnesium peroxide had been spent after a six month period, with performance characteristics similar to ORC.

Although the present invention has been described with reference to certain preferred embodiments thereof, other versions are readily apparent to those of ordinary skill in the art. Therefore, the spirit and scope of the appended claims is not limited to the description of the preferred embodiments contained herein.

What is claimed is:

1. A method for treating environmental contaminants dissolved in groundwater and absorbed onto formation matrices such as fuel hydrocarbons such that said environmental contaminants are anthropogenic contaminants that are biologically degradable under aerobic conditions, comprising the steps of:
   mixing a blend of magnesium peroxide and a powdered phyllosilicate which slows the rate of magnesium peroxide disassociation by reducing hydraulic conductivity and wherein said magnesium peroxide disassociates to dissolved oxygen at a substantially slower rate than if said powdered phyllosilicate was absent from said blend;
   treating the contaminated groundwater with said blend for approximately six months wherein the release of dissolved oxygen continues to cause said contaminates to be removed from the groundwater;
   wherein said magnesium peroxide and said powdered phyllosilicate are blended together, such that said magnesium peroxide ranges from 50 to 80% by weight and wherein said powdered phyllosilicate ranges from 50 to 20% by weight, respectively.

2. The method of claim 1 wherein said blend has an amount of magnesium peroxide that is 80% by weight and an amount of powered phyllosilicate that is 20% by weight.

3. The method of claim 2 wherein said powdered phyllosilicate is Bentonite.

* * * * *